3,013,066
Patented Dec. 12, 1961

3,013,066
DIMERIZATION OF ALPHA OLEFINS WITH A GROUP VIII NOBLE METAL SALT
Thomas Alderson, Wilmington, Del., assignor to E. I. du Pont de Nemours and Company, Wilmington, Del., a corporation of Delaware
No Drawing. Filed Mar. 23, 1961, Ser. No. 94,415
16 Claims. (Cl. 260—486)

This invention relates to a novel catalytic process for effecting interaction of olefinic compounds. This application is a continuation-in-part of Serial No. 704,910 filed December 24, 1957, to T. Alderson and now abandoned.

The literature contains numerous references to catalytic processes for the interaction of olefins, i.e., for the self-addition of olefins and for the reaction of one olefin with another. For the most part, these processes give a complex mixture of products, in many cases high polymers. Recently, Ziegler (Angew. Chemie 64, 323, 330 (1952) and 68, 721 (1956)) has disclosed that the self-addition of α-olefins can be made to give principally dimers through the use of aluminum trialkyls as catalysts. The dimers formed by this method are principally α-olefins, i.e., the unsaturation is in the terminal or 1-position. For example, on heating with aluminum triethyl, ethylene gives 1-butene, and propylene gives 2-methyl-1-pentene. Similarly, the heating of a mixture of ethylene and propylene with aluminum trialkyl gave 2-methyl-1-butene, along with other α-olefins, by a reaction which Ziegler referred to as "mixed-dimerization." Ziegler's catalysts cannot be used in the presence of protonic solvents or contaminants, i.e., compounds containing active hydrogen, such as water and alcohols; and, as indicated above, they give principally terminally unsaturated products.

An object of this invention is to provide an improved method for the interaction of olefinic compounds including the addition of one α-olefinic compound to another. Another object is to provide a catalytic process for the interaction of α-olefinic compounds to form 1:1 molar adducts, i.e., dimers or mixed dimers depending upon whether one or more olefinic compounds is used. Still another object is to provide a method for the interaction of α-olefins that is effective in the presence of protonic solvents and which yields, in substantial amount, products having internal unsaturation.

These objects are accomplished by reacting an α-olefinic compound containing the vinyl group

with an α-olefinic compound of the same group, at a pressure of at least 10 atmospheres and in the presence of a catalytic amount of a group VIII noble metal salt. Preferably, the molar ratio of salt to α-olefinic compound will be from about 0.0001 to 0.10, however, it should be understood that even lower amounts can be used so long as they provide catalytic activity. It is also to be understood that the above terminology includes the reaction between α-olefinic compounds which may be the same or different.

Exemplary of this group of α-olefinic compounds are those represented by the general formula

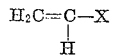

wherein X is hydrogen, halogen, hydrocarbon, halohydrocarbon, alkoxycarbonyl, acyloxyalkyl, acyloxy, nitrile, aminoalkyl, hydroxyalkyl or carbonamido. A preferred group of α-olefinic compounds within this group are those wherein X is hydrogen, hydrocarbon, halogen, halohydrocarbon, alkoxycarbonyl, or acyloxyalkyl (carboxylato-alkyl) and which have no more than 12 carbon atoms. Specific α-olefinic compounds usefully employable are ethylene, propylene, 1-butene, 1-octene, 1-dodecene, 3-methyl-1-pentene, 3-methyl-4-ethyl-1-hexene, 3-methyl-1-butene, 1-hexene, 5-methyl-1-hexene, 3,4-dimethyl-1-pentene, 3,3-dimethyl-1-butene, 1-pentene, 3-methyl-1-hexene, vinyl cyclohexene, 1-decene, styrene, 1,3-butadiene, 1,4-hexadiene, 2-methyl-1,3-butadiene, 2-chloro-1,3-butadiene, 2-fluoro-1,3-butadiene, vinyl chloride, methyl acrylate, acrylonitrile, acrylamide, allyl alcohol, allyl acetate, allyl butyrate, allylamine and the like.

The salts of noble metals of group VIII in which the sole positive metal ion is that of the noble metal constitute a preferred group of catalysts. Examples of such salts are chlorides, bromides, iodides, sulfates, nitrates, and salts of aliphatic acids having up to 18 carbon atoms. Specific examples are ruthenium dichloride, ruthenium tetrachloride, ruthenium triiodide, ruthenium nitrate, ruthenium trinaphthenate, ruthenium tristearate, rhodium trichloride, platinum dichloride, platinum tetrachloride, platinum tetraacetate, platinum tetraiodide, platinic sulfate tetrahydrate, palladium dibromide, palladium sulfate, osmium dichloride, osmium trichloride, iridium tetrachloride, iridium tetrabromide, iridium triiodide, and their hydrates. Since outstanding results are obtained with bromides and chlorides, and since they are readily available, they constitute an especially preferred group of catalysts.

The process of this invention is carried out at 20° to 275° C. The temperature selected in any one instance depends to a great degree upon the amount and particular catalyst used. Thus, with salts of ruthenium and rhodium, excellent results are obtained at temperatures below 100° C. On the other hand, salts of platinum, palladium, osmium and iridium require higher temperatures, i.e., temperatures of 130–225° C. to bring about reaction at a reasonable rate. Because of their higher activity at lower temperatures the preferred catalysts are the salts of ruthenium and rhodium.

The process is carried out at pressures which are at least 10 atmospheres, because operation under a positive pressure has a beneficial effect on reaction rate and yield of desired product. Pressures above 2000 atmospheres can be used, but since this does not result in any practical compensating advantages, this constitutes a practical operating upper limit. The best balance from the standpoint of yield, reaction rate, and ease of operation, is realized at pressures of 50–1500 atmospheres.

The time of reaction is a variable factor dependent upon such interdependent variables as nature of olefin, particular salt of noble metal of group VIII and amount used, temperature, pressure, and type of reaction medium, if any. Generally, however, the reaction is permitted to proceed at the temperature and pressure selected for operation for at least 30 minutes. There is no compensating advantage in operating for more than 30 hours and this therefore represents a practical upper time limit. Most generally, the reaction is carried on for from 5–15 hours.

In practice a pressure reactor is charged with the noble metal salt, and, if desired, a reaction medium. The reactor is then cooled, evacuated and the olefinic compound is added. The charged reactor is then maintained between 20° and 275° C. with agitation. After pressure drop has essentially ceased, the reaction mixture is allowed to cool, the reactor is opened, and the contents discharged. The desired product is isolated by distillation or other means known to those skilled in the art.

The reaction may also be carried out in a continuous manner, as, for example, by continuously introducing catalyst and the olefinic starting material into a reactor and continuously withdrawing reaction mass. A series of reactors may also be used. These may be arranged, if desired, in cascade fashion. The reaction may also be carried out in continuous flow through an elongated reactor, such as, for example a pipe.

The examples which follow illustrate but do not limit this invention. Unless otherwise specified, parts are by weight, a 400 ml. reactor was used, the noble metal halide salt catalysts are in the form of hydrates, and the ruthenium chloride is the commercial mixture of chlorides.

Example I

A pressure reactor was charged with 79 parts of a 0.04 molar solution of ruthenium trichloride in methanol. The reactor was cooled, evacuated, pressured with ethylene, and the charge heated at 130° C. with agitation for 10 hours at 500–800 atmospheres pressure. There was obtained 186.5 parts of a mixture of low boiling materials which condensed in a receiver cooled in solid carbon dioxide, and contained cis- and trans-2-butene, 1-butene, ethylene, and ethane, as determined in infrared analyses. There was also obtained 128 parts of clear brown liquid which distilled at 25–64° C./3 mm. pressure. The distillate consisted of two phases which were separated and fractionally distilled individually. From these distillations there was obtained 30 parts of olefin, which was characterized by boiling point (66–68° C.), refractive index (1.3830–1.3923), and infrared analyses as a mixture of $C_6$ olefins, 15 parts of $C_8$ olefins, B.P. 119–126.5° C., $n_D^{25}=1.4170$–1.4191, and 16 parts of $C_{10}$ and $C_{12}$ olefins, B.P. 74–79° C./95 mm. $n_D^{25}=1.4315$–1.4512.

Example II

A pressure reactor was charged with 88 parts of tetrahydrofuran and 1.048 parts of ruthenium trichloride. The reactor was cooled, evacuated, and pressured with ethylene so that at 140° C. the pressure was 1000 atmospheres. During 10 hours reaction time, the observed pressure drop was 800 atmospheres. There was obtained 55 parts of cis- and trans-2-butene and 1-butene, as determined by infrared analysis and gas chromatography. In addition, there was obtained 23 parts of $C_6$–$C_{12}$ olefins identified by infrared analysis, B.P. from 66° C./atmospheric pressure to 72° C./2 mm. and $n_D^{25}=1.4202$–1.4662.

Example III

A pressure reactor was charged with 79 parts of a 0.025 molar iridium trichloride solution in methanol. The reactor was cooled, evacuated, and pressured with ethylene so that at 125–200° C. the pressure was 1000 atmospheres. During a 10-hour reaction period, the pressure drop was 305 atmospheres. There was obtained 56.6 parts of low-boiling material which was shown to be mainly cis- and trans-2-butene, some 1-butene and a trace of ethylene by infrared analysis. There was removed from the pressure reactor 93 parts of dark red liquid which was distilled rapidly at 5 mm. pressure. The distillate was washed with twice its volume of aqueous calcium chloride solution and there was obtained 9 parts of organic liquid which decolorized aqueous potassium permanganate rapidly, had a refractive index of 1.4101 and was shown by infrared analysis to contain unsaturation, some carbonyl functionality and saturated carbon-hydrogen bonds.

Example IV

A pressure reactor was charged with 79 parts of methanol and 3 parts of a 1-molar palladous chloride solution in 12 N HCl. The reactor was cooled, evacuated and pressured with ethylene to 800 atmospheres at 200° C. A pressure drop of 420 atmospheres was observed during a 10-hour reaction period. There was obtained 81 parts of low-boiling material which was shown by gas chromatography to contain 29% cis-2-butene, 49.6% trans-2-butene, 10.4% 1-butene, 9.4% ethylene, and 1.6% of a mixture of carbon dioxide, ethane and air. These compounds were also identified by infrared analysis. There was also obtained 76 parts of liquid which was distilled at 3 mm. pressure to give 69 parts of distillate. The distillate was washed with two times its volume of aqueous calcium chloride solution and 2.46 parts of olefins, $n_D^{25}=1.4266$, was separated. This product decolorized aqueous potassium permanganate solution and gave a negative test with 2,4-dinitrophenylhydrazine.

Example V

A pressure reactor was charged with 78 parts of acetonitrile and 0.5 part of ruthenium trichloride. The reactor was cooled, evacuated and pressured with ethylene. The reactants were agitated at 210° C./970 atmospheres for 10 hours during which time a pressure drop of 885 atmospheres was observed. From this experiment, there was obtained 47 parts of low-boiling products which were shown by gas chromatography and infrared analyses to consist of 27.8% cis-2-butene, 46% trans-2-butene, 11.3% 1-butene, 13.4% ethylene, and 1.7% of a mixture of carbon dioxide, ethane and air. There was removed from the reactor 133 parts of liquid which was distilled at reduced pressure; 9.15 parts boiling at 75° C./10 mm. and having a $n_D^{25}=1.4550$; 2.35 parts boiling at 82–99° C./3 mm. and having a $n_D^{25}=1.4731$; 103 parts of distillate was condensed in a receiver cooled in solid carbon dioxide. The distillates were combined and added to 200 parts of water, the organic phase was separated, dried over anhydrous magnesium sulfate and distilled through a 15-inch packed column. From this distillation, there was obtained 21 parts of $C_6$–$C_{10}$ olefins, boiling from 44 to 182° C., $n_D^{25}=1.3845$–1.4480, which rapidly decolorized aqueous potassium permanganate solution and had the characteristic infrared absorption for terminal and internal monoolefins.

Example VI

A pressure reactor was charged with 79 parts of 0.025 molar solution of iridium trichloride in methanol. The reactor was cooled, evacuated, and charged with 220 parts of propylene. The reactants were agitated at 143° C./1000 atmospheres for 10 hours. A pressure drop of 15 atmospheres was observed during this period. There was obtained from this experiment 105.5 parts of clear liquid and a small amount of black solid. The products were distilled at reduced pressure and 93 parts were condensed in a receiver, cooled in solid carbon dioxide; 2.48 parts boiled at 58–60° C./34 mm. $n_D^{25}=1.4388$ (this material decolorized aqueous potassium permanganate) and 0.97 part boiled at 60–70° C./1 mm., $n_D^{25}=1.4451$. The low-boiling fraction from this distillation (93 parts) was washed with twice its volume of aqueous calcium chloride and 24.39 parts of organic phase, $n_D^{25}=1.4000$ was separated. This material was fractionally distilled and found to consist of 14 parts of a mixture of cis- and trans-n-hexenes, B.P. 61–66° C., $n_D^{25}=1.3932$ (identified by infrared analysis) and 9 parts of isomeric $C_6$-olefins. The higher-boiling fractions were shown by infrared analysis to be mixtures of $C_9$–$C_{15}$ monoolefins.

Example VII

A reaction vessel, charged with 79 parts of methanol and 0.3 part of rhodium trichloride, was maintained at 30–35° C. and pressured with ethylene to 1000 atmospheres for a period of 16 hours. The product was distilled from the vessel and 78 parts of material was collected. This was analyzed by gas chromatography and found to consist of 19.5% 1-butene, 50.5% trans-2-butene, and 28% cis-2-butene.

Example VIII

A vessel was charged with 79 parts of methanol and 2 parts of rhodium chloride. At 50° C. it was pressured with ethylene to 34 atmospheres and maintained there. After 16 hours, the product was distilled and condensed in a solid carbon dioxide cooled trap, whereupon 127 parts of product characterized as butenes by boiling point was obtained.

Example IX

A pressure vessel was charged with 79 parts of ethanol and 2 parts of ruthenium chloride and the charge heated to 50° C. under 1000 atmospheres of ethylene pressure. After 16 hours, the product was distilled and 175 parts of material was collected, which was characterized as $C_4$ olefins by boiling point.

Example X

A pressure vessel was charged with 79 parts of ethanol, 1.68 parts of rhodium trichloride, 4 parts of potassium acetate, and 108 parts of butadiene. The mixture was heated to 100° C. where it was held for 16 hours. The reaction mixture was cooled and unreacted butadiene removed by venting the reactor. The reaction product was washed with an equal volume of aqueous calcium chloride solution to remove the ethanol, and the organic layer was distilled. There was obtained 36 parts of distillate and 11 parts of residue. Redistillation of the volatile product yielded equal quantities of 2,4,6-octatriene, B.P. 66° C. at 40 mm., $n_D^{25}=1.5355$, and of isomeric hydrocarbons, B.P. 45° C. at 40 mm. The ultraviolet absorption spectrum of the octatriene possessed a maximum at 2640 A. ($\epsilon_{max.}=46,300$), which is indicative of a conjugated triene structure. The infrared spectrum of the triene also indicated the absence of terminal double bonds. Catalytic hydrogenation of the octatriene yielded pure n-octane, identified by its infrared spectrum.

Example XI

A pressure vessel was charged with 79 parts of ethanol, 1.68 parts of rhodium trichloride and 108 parts of butadiene. Ethylene was introduced and the mixture was heated to 100° C. and pressured to 1000 atmospheres. During a 16-hour reaction period, a total pressure drop of 890 atmospheres was observed. The mixture was cooled and excess ethylene was vented. The reaction mixture was distilled at reduced pressure and washed twice with aqueous calcium chloride solution to remove ethanol. The hydrocarbon product was then fractionally distilled whereupon $C_8$-fractions were obtained as the major products; one, 42 parts, B.P. 109° C., $n_D^{25}=1.4212$, was an unconjugated eight-carbon diolefin which gave 3-ethylhexane upon hydrogenation; the other, 37 parts, B.P. 73° C. at 100 mm., $n_D^{25}=1.4645$, was a conjugate $C_8$ diolefin and gave a mixture of 3-methylheptane and 3-ethylhexane upon hydrogenation. The remainder of the product comprised isomeric $C_8$ diolefins along with some higher molecular weight hydrocarbons ($C_{10}$, $C_{12}$, etc.).

Example XII

A reaction vessel containing 79 parts of ethanol, 1 part of rhodium trichloride, 139 parts of butadiene, and 73 parts of ethylene was heated to 50° C. under autogenous pressure. These conditions were maintained for 16 hours. The reactor was cooled and the product distilled. The low-boiling material was washed twice with aqueous calcium chloride solution, whereupon 183 parts of hydrocarbon was obtained. The higher-boiling fraction amounted to 14 parts and the still residue to 4 parts. Redistillation of the low-boiling hydrocarbon gave 58 parts of 1,4-hexadiene, B.P. 65° C., and 65 parts of 2,4-hexadiene, B.P. 82° C.

Example XIII

A reaction vessel was charged with 78 parts of ethanol, 2 parts of rhodium trichloride, and 126 parts of propylene. The charge was heated to 50° C. under autogenous pressure and 87 parts of butadiene was added over a 6-hour period. After an additional 10 hours, the mixture was cooled and unreacted propylene was vented. The product was distilled and the low-boiling fraction was washed twice with aqueous calcium chloride solution, whereupon 142 parts, $n_D^{25}=1.4181$, was obtained. The higher-boiling fraction, B.P. 35° C. at 2 mm., $n_D^{25}=1.4540$ amounted to 14 parts. The low-boiling fraction was 94% 2-methyl-1,4-hexadiene. This identification was based on elemental analysis, molecular weight, ultraviolet and infrared spectra.

Example XIV

A pressure vessel was charged with 79 parts of ethanol, 3 parts of rhodium trichloride, and 126 parts of propylene. The charge was heated to 60° C. and ethylene was admitted to a pressure of 1000 atmospheres. These conditions were maintained for 16 hours. The mixture was cooled and the volatile products bled through a trap cooled to −75° C. Fractional distillation of the material from the trap gave 57 parts of propylene and 41 parts of butenes. The residue from this distillation was added to the contents of the reactor and the whole was distilled. The distillate was washed three times with aqueous calcium chloride solution whereupon 67 parts of hydrocarbon was obtained. Redistillation yielded 20 parts of pentenes, B.P. 34–36° C., $n_D^{25}=1.3770-1.3800$ and 21 parts of hexenes, B.P. 63–66° C., $$n_D^{25}=1.3925-1.3950$$

Example XV

A pressure reactor was charged with 79 parts of ethanol, 3 parts of rhodium trichloride, and 190 parts of propylene. The reaction mixture was heated to 50° C. and held under autogenous pressure for 16 hours. The reactor was allowed to cool, opened, and unreacted propylene vented. The higher boiling fraction was distilled and the distillate washed twice with aqueous calcium chloride solution, whereupon 6 parts of product was obtained. This was found to be a mixture of six-carbon olefins, B.P. 66° C. to 67° C., $n_D^{25}=1.3929-1.3939$.

Example XVI

A pressure vessel was charged with 79 parts of ethanol, 2 parts of rhodium trichloride, 177 parts of chloroprene (2-chloro-1,3-butadiene) and 56 parts ethylene. It was heated to 50° C. and held there for 16 hours. The reaction mixture was then distilled and the distillate was washed twice with aqueous calcium chloride solution. The washed distillate was then fractionally distilled through a Podbielniak column whereupon chloroprene was recovered and chlorohexadienes were obtained. The latter comprised a low-boiling fraction, 15 parts, B.P. 42–57° C./60 mm., $n_D^{25}$ 1.4440–1.4760; and a high-boiling fraction, 35 parts, B.P. 59–60° C./60 mm., $n_D^{25}$ 1.4870. The low-boiling fraction was chiefly non-conjugated chlorohexadiene whereas the high-boiling fraction was a conjugated chlorohexadiene as demonstrated by its ultraviolet absorption spectrum $\lambda_{max.}$, 2310 A. (K=187).

*Anal. of high-boiling fraction.*—Calcd. for $C_6H_9Cl$: C, 61.81; H, 7.78; Cl, 30.41. Found: C, 61.24; H, 7.81; Cl, 30.90.

Example XVII

A pressure vessel was charged with 79 parts of ethanol, 2 parts of rhodium trichloride, 156 parts of styrene and pressured with ethylene to 1000 atm. The mixture was agitated and held at 50° C. for 16 hours. The reaction mixture was distilled whereupon 72 parts of 2-phenylbutene, B.P. 60° C. at 6 mm., $n_D^{25}$ 1.5367 was obtained. The ultraviolet spectrum corresponded to that of a substituted styrene. Partial hydrogenation gave 2-phenylbutane, identified by its boiling point, index of refraction and infrared spectrum.

Example XVIII

A reaction vessel was charged with two parts of rhodium trichloride, 180 parts of butadiene, and 76 parts of ethylene. It was heated to 50° C. and maintained there for 16 hours. It developed a maximum pressure of 400 atm. The reactor was cooled and the product distilled, whereupon 237 parts of volatile product and 11 parts of residue were obtained. Gas chromatography of the distilled product demonstrated it to comprise 17% 1,4-hexadiene and 68% 2,4-hexadiene.

One hundred seventy eight parts of mixed hexadienes, prepared as above, were charged into a pressure vessel, together with 2 parts of rhodium trichloride. The reactor was then pressured with ethylene so that at 50° C. the pressure was 950 atmospheres. After 16 hours at this temperature the pressure had decreased to 250 atmospheres. The reactor was vented and the product distilled to give 203 parts of volatile hydrocarbons and 14 parts of non-volatile residue. The distillate was assayed by gas chromatography and found to contain 26% of $C_8$ dienes and the remainder was principally recovered hexadienes.

*Example XIX*

A reaction vessel was charged with 2 g. of rhodium trichloride and pressured with ethylene to 500 atm. at a temperature of 55° C. The temperature was maintained and ethylene was repressured as consumed. At the end of 16 hours the reaction vessel was cooled to −10° C., opened, and found to be completely filled with liquid hydrocarbon (252 g.). The product was assayed by gas chromatography and found to comprise 69% trans-2-butene, 27% cis-2-butene and 3% 1-butene.

*Example XX*

A pressure reactor was charged with 40 parts of methanol, 145 parts of methyl acrylate, two parts of a commercial mixture of ruthenium chlorides, and two parts of hydroquinone. The reactor was cooled, evacuated, and the charge heated at 210° C. under autogenous pressure for ten hours. There was recovered 171 parts of dark brown liquid which was distilled rapidly through a 12-inch distilling column to yield three fractions: (I) 92 parts, B.P. less than 30° C./10 mm., $n_D^{25}$ 1.3628; (II) 35 parts, B.P. 103–112° C./6 mm., $n_D^{25}$ 1.4507; (III) 37 parts of higher-boiling products.

Fraction I was shown by infrared analysis to be a mixture of methyl propionate and methanol. The methyl propionate was separated by washing the mixture with twice its volume of saturated aqueous calcium chloride. The organic phase which separated amounted to 65 parts. It was fractionally distilled, B.P. 79° C., $n_D^{25}$ 1.3748, and infrared analysis showed it to be methyl propionate. (Lit. values for methyl propionate, B.P. 79.9° C., $n_D^{20}$ 1.3779.)

Fraction II was shown by infrared and ultraviolet analyses to be a monounsaturated ester in which the unsaturation was conjugated with the carbonyl of the ester and as the subsequent identification shows this product was the dimer of methyl acrylate, dimethyl α-dihydromuconate. (Lit. values for dimethyl α-dihydromuconate, B.P. 98–105° C./5 mm., $n_D^{25}$ 1.4506.) This unsaturated ester was then hydrogenated in dioxane solution over palladium oxide-on-charcoal catalyst at 80° C. and 1000 lb./sq. in. The hydrogenated product was fractionally distilled to yield dimethyl adipate, B.P. 97° C./4.5 mm., $n_D^{25}$ 1.4262, M.P. 8–10° C., sap. eq. 86.9. (Lit. values for dimethyl adipate, B.P. 107.6° C./11 mm., $n_D^{25}$ 1.4265, M.P. 8.5° C., sap. eq. 87.) Infrared and nuclear magnetic resonance spectra for this compound were identical with authentic samples of dimethyl adipate. The dimethyl adipate was saponified, the free acid isolated, and recrystallized from nitric acid, M.P. 147–150° C., mixed M.P. with an authentic sample of adipic acid, 149–151° C.

*Example XXI*

A pressure reactor was charged with 86 parts of methyl acrylate, 79 parts of methanol, and 1.5 parts of a commercial mixture of ruthenium chlorides. The reactor was cooled and evacuated, pressured with ethylene, and heated at 150° C. and 700 atm. for 16 hours. A pressure drop of 1160 atm. occurred during the reaction period. There was recovered 30 parts of a mixture of cis and trans 1- and 2-butenes, as identified by infrared analysis. There was also obtained 245 parts of liquid products which were distilled through a 12-inch distilling column to yield the following fractions: (I) 141 parts which boiled at less than 30° C./10 mm., $n_D^{25}$ 1.3650; (II) 43 parts boiling 43–75° C. /10 mm., $n_D^{25}$ 1.4290; (III) 32 parts of product boiling 65–80° C./2 mm., $n_D^{25}$ 1.4532, and 10 parts of higher-boiling materials.

Fraction I was shown by infrared analysis to be a mixture of methyl acrylate and trans-2-hexene. Fraction II was shown to be methyl 3-pentenoate, B.P. 67° C./62 mm., $n_D^{25}$ 1.4229, sap. eq. 127, calcd. sap. eq. 114. Further identified by infrared analysis. Fraction III had an infrared absorption spectrum corresponding to that of the dimethyl α-dihydromuconate of the preceding example. The unsaturated esters of Fractions II and III were mixed and hydrogenated over palladium oxide on charcoal at 80° C. and then fractionally distilled. From this distillation there was obtained methyl valerate as the main constituent, B.P. 127° C., $n_D^{25}$ 1.3948, sap. eq. 119. (Lit. values for methyl valerate, B.P. 127.7, $n_D^{15}$ 1.3993, sap. eq. 116.) This compound was shown to be methyl valerate by infrared and nuclear magnetic resonance analyses. Dimethyl adipate was also obtained, B.P. 82–85° C./8 mm., $n_D^{25}$ 1.4292, confirmed by infrared analysis, together with a small amount of methyl enanthate, B.P. 75° C./20 mm., $n_D^{25}$ 1.4120, sap. eq. 150.5. The amide of this acid was also prepared, M.P. 93–95° C. (Lit. values for methyl enanthate, B.P. 173.8° C., $n_D^{15}$ 1.4133, sap. eq. 144. Enanthamide M.P. 97° C.)

*Example XXII*

A pressure reactor was charged with 107 parts of allyl acetate, 79 parts of methanol, and one part of a commercial mixture of ruthenium chlorides. The reactor was cooled and evacuated and 54 parts of butadiene was added. The reactants were heated at 150° C. under 260 lb./sq. in. pressure for 16 hours. There was recovered 10 parts of olefins made up of propylene and butadiene, identified by infrared analysis, and 193 parts of liquid products.

The liquid products were distilled through a 12-inch distilling column to yield the following fractions: (I) 125 parts, B.P. less than 40° C./3 mm., $n_D^{25}$ 1.3670; (II) 15.5 parts, B.P. 52–56° C./2 mm., $n_D^{25}$ 1.4127; (III) 8 parts, B.P. 62–94° C. 12 mm., $n_D^{25}$ 1.4770; and (IV) 34.4 parts of higher-boiling materials. These cuts were then fractionally distilled and the following products identified. Methyl acetate-methanol azeotrope, B.P. 53–54° C., $n_D^{25}$ 1.3549. (Lit. values of methyl acetate-methanol azeotrope, 54° C.) This fraction was also identified by infrared analysis. Allyl acetate, B.P. 103–106° C., $n_D^{25}$ 1.3992. (Lit. values for allyl acetate, B.P. 104° C., $n_D^{20}$ 1.4049.) This compound was also identified by infrared analysis. Two higher-boiling unsaturated esters were also detected by infrared analysis. The lower-boiling, 94° C./32 mm. (corr. B.P. 190° C.), $n_D^{25}$ 1.4497, present in a larger amount, had a sap. eq. of 225 and took up 0.029 part of hydrogen per part of compound. Thus, this unsaturated ester was made up of two moles of butadiene and one mole of allyl acetate and contained three double bonds (for $CH_3COOC_{11}H_{17}$ calcd. sap. eq. 208 and hydrogenation eq. 1 mole of hydrogen equivalent to 69 parts of compound). The infrared absorption of the compound showed that it contained internal transunsaturation. The second unsaturated ester boiled 90–99° C./1 mm. (corr. B.P. 269–280° C.), $n_D^{25}$ 1.4789. The infrared absorption from this compound showed it was unsaturated ester containing internal trans-unsaturation.

Example XXIII

A silver-lined pressure vessel was charged with 222 parts of vinyl chloride and 3 parts of rhodium trichloride trihydrate. It was heated to 70° C. and pressured with ethylene to 975 atm. During a 16-hour reaction period, the pressure drop amounted to 125 atm. The vessel was cooled and the materials boiling below room temperature were vented, whereupon 46 parts of liquid product remained. Distillation gave 20 parts of chlorobutenes, B.P. 63–78° C., $n_D^{25}$ 1.4075–1.4186. The chlorobutenes were contaminated with a small quantity of hydrocarbons (isomeric hexenes derived from the ethylene). The analysis of a representative fraction (B.P. 70° C., $n_D^{25}$ 1.4120) was C, 56.61; H, 8.83; Cl, 34.88. (Calcd. for a mixture of 89% chlorobutenes and 11% hexenes: C, 56.63; H, 8.52; Cl, 34.85.) The infrared spectrum showed absorption bands at 6.0 and 6.1, which are characteristic of carbon-carbon unsaturation.

Example XXIV

A one-gallon glass-lined autoclave was charged with 0.25 g. ($9.5 \times 10^{-4}$ mole) of $RhCl_3 \cdot 3H_2O$ dissolved in 25 ml. (19.5 g.) of absolute ethanol. Subsequently, 1000 g. of 1,3-butadiene (18.5 moles) and 500 g. of ethylene (17.8 moles) were charged to the autoclave, and the autoclave was heated to 60° C. The temperature was held 60–70° C. for one hour, the autoclave was cooled to room temperature and the products discharged. The volatile products were separated by stripping under reduced pressure, washed three times with water and dried over anhydrous magnesium sulfate. Vapor phase chromatographic analysis was used to determine the yield and composition of products.

A crude yield of 406 g. of liquid product was obtained after the washing operation which had the following composition: 1,3-butadiene, 14.6%; trans-1,4-hexadiene, 57.7%; cis-1,4-hexadiene, 18.2%; trans,trans-2,4-hexadiene, 4.1%; trans,cis-2,4-hexadiene, 3.1%.

Example XXV

As described in Example XXIV above, a charge of 0.125 g. ($4.8 \times 10^{-4}$ mole) of $RhCl_3 \cdot 3H_2O$ dissolved in 30 ml. (23.4 g.) of absolute ethanol, 1000 g. of 1,3-butadiene (18.5 moles) and 500 g. of ethylene (17.8 moles) was held between 66–67° C. for 120 minutes. After stripping and washing, a yield of 272 g. of liquid product was obtained having the following composition: 1,3-butadiene, 9.3%; trans-1,4-hexadiene, 65.9%; cis-1,4-hexadiene, 18.1%; trans,trans-2,4-hexadiene, 2.9%; trans,cis-2,4-hexadiene, 2.1%.

When this reaction is carried out for 240 minutes instead of 120 minutes, 500 g. of product is obtained.

When this reaction is carried out at 71–72° C. instead of 66–67° C., 580 g. of product is obtained.

Example XXVI

As described in Example XXIV above, a charge of 0.063 g. ($2.4 \times 10^{-4}$ mole) of $RhCl_3 \cdot 3H_2O$ dissolved in 30 ml. of absolute ethanol and 6 ml. of concentrated hydrochloric acid, 1000 g. of 1,3-butadiene (18.5 moles) and 500 g. of ethylene (17.8 moles) was held between 70–72° C. for 143 minutes. After stripping and washing, a yield of 385 g. of liquid product was obtained having the following composition: 1,3-butadiene, 29.7%; 3-methyl-1,4-pentadiene, 1.4%; trans-1,4-hexadiene, 49.9%; cis-1,4-hexadiene, 14.4%; trans,trans-2,4-hexadiene, 2.3%; trans,cis-2,4-hexadiene, 1.9%; cis,cis-2,4-hexadiene, 0.3%.

As illustrated by the examples the process of this invention can be carried out in the presence or absence of an added liquid, inert, reaction medium. Suitable media are alcohols, especially short chain monohydric alcohols, such as, methanol, ethanol, propanol, and butanols; cyclohexanols; ethers such as the dimethyl ether of ethylene glycol, tetrahydrofuran, etc.; and aliphatic nitriles such as acetonitrile, propionitrile, etc. The preferred reaction media are the short chain aliphatic monohydric alcohols because they are generally good solvents for the salts of the group VIII noble metals.

The amount of reaction medium is not critical and it can equal or exceed the olefin by 40- or more fold. In some cases it is desirable to include a small amount of a polymerization inhibitor such as hydroquinone in the initial charge.

The process of this invention provides an easy route to valuable compounds hitherto accessible only by expensive or difficult procedures. It makes possible production of internally unsaturated olefins, e.g., the conversion of ethylene to 2-butene, which is a precursor of maleic anhydride, tetrahydrofuran, and tetramethylene glycol. It also makes possible the production of dihydromuconic acid esters, which are readily hydrogenated to adipic acid esters, from acrylates and the cross-dimerization of butadiene with ethylene to produce 1,4-hexadiene and of propylene with butadiene to produce 2-methyl-1,4-hexadiene. These dienes can be polymerized to yield film-forming materials which are tough and free of tack upon baking. They are therefore useful as protective coatings. This use is illustrated in Examples A and B which follow:

EXAMPLE A

Twelve parts of 2-methyl-1,4-hexadiene, prepared as in Example XIII, was added to a freshly prepared catalyst slurry in benzene in an atmosphere of nitrogen. The catalyst system was prepared by adding 0.34 parts of vanadium tetrachloride and 0.64 parts of aluminum triisobutyl to 32 parts of anhydrous benzene. An exothermic reaction occurred when the diene was added. The temperature was maintained between 30 and 50° C. with a cooling bath for the thirty minutes that heat evolution continued. After 16 hours at room temperature an additional 0.64 part of aluminum triisobutyl was added but no further reaction was noted. Forty parts of methanol and 50 parts of 3 N hydrochloric acid were added to wash out the catalyst. The top layer of the resulting two-phase system was separated, washed with 3 N hydrochloric acid, then with water, and the benzene solvent was distilled off. The product remaining, after the still pot was heated to 340° C. without further distillate coming over, was a yellowish, viscous oil. Its molecular weight was 370 and its infrared absorption indicated the structure

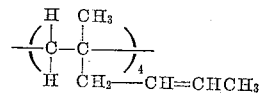

One part of the above polymeric product was dissolved in approximately 10 parts of toluene. To half of this solution was added 0.05 part of cobalt drier (6% cobalt metal content) and the two solutions were cast on glass. After most of the solvent had evaporated in the air the films were baked at 125° C. for the 30 minutes. The film with the cobalt drier was non-tacky, clear and very light in color. The control, which contained no drier, was still somewhat tacky.

EXAMPLE B

Six parts of 2,4-hexadiene, prepared as in Example XII, was added to a freshly prepared catalyst system consisting of 0.17 part of titanium tetrachloride and 0.32 part of aluminum triisobutyl in 14 parts of anhydrous heptane. Evolution of heat and negative pressure in the flask were noted. The reaction mixture was put on a vibrator overnight and worked up in the manner of Example A to give a tacky gum weighing 2 grams. A solution in toluene prepared as in Example A and baked 15 minutes at 120° C. gave a clear, non-tacky film.

What is claimed is:
1. A process for preparing normally fluid products comprising reacting an α-olefinic compound of the formula

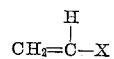

wherein X represents a member of the group consisting of hydrogen, hydrocarbon, halogen, halohydrocarbon, alkoxycarbonyl, and carboxylatoalkyl, said compound having up to 12 carbon atoms with an alpha olefinic compound of the formula $$CH_2=\overset{H}{\underset{|}{C}}-X$$

wherein X is as defined above, at a pressure of at least 10 atmospheres, and at a temperature in the range of from about 20°–275° C. and in the presence of a group VIII noble metal salt, the molar ratio of salt to α-olefinic compound being from 0.0001 to 0.10.

2. The process of claim 1 wherein the noble metal salt is a chloride.

3. The process of claim 1 wherein the salt is present in solution.

4. The process of claim 3 wherein the solvent is methanol.

5. A process for preparing normally fluid products by olefin self-addition comprising reacting an α-olefinic compound of the formula $$CH_2=\overset{H}{\underset{|}{C}}-X$$

wherein X represents a member of the group consisting of hydrogen, hydrocarbon, halogen, halohydrocarbon, alkoxycarbonyl, and carboxylatoalkyl, said compound having no more than 12 carbon atoms at a pressure of at least 10 atmospheres at a temperature in the range of from about 20° to 275° C. and in the presence of a group VIII noble metal salt, the molar ratio of salt to α-olefinic compound being from 0.0001 to 0.10.

6. A process for preparing normally fluid products comprising reacting an alpha-olefinic hydrocarbon of up to ten carbons at a pressure of at least 10 atmospheres, and at a temperature in the range of from about 20° to 275° C., in the presence of a group VIII noble metal salt, the molar ratio of salt to alpha-olefinic compound being from 0.0001 to 0.10.

7. A process for preparing normally fluid products comprising reacting an alpha-olefinic compound containing conjugated unsaturation with an alpha-olefinic compound of the formula $$H_2C=\overset{H}{\underset{|}{C}}-X$$

wherein X is selected from the group consisting of hydrogen, hydrocarbon, halogen, halohydrocarbon, alkoxycarbonyl, and carboxylatoalkyl, said compound having up to 12 carbon atoms, at a pressure of at least 10 atmospheres, and at a temperature within the range of from about 20° to 275° C., in the presence of a group VIII noble metal salt, the molar ratio of salt to the reactants being from 0.0001 to 0.10.

8. A process for reacting ethylene with butadiene to form normally fluid products which comprises contacting them at a pressure of at least 10 atmospheres and at a temperature in the range of 20° to 275° C., in the presence of a group VIII noble metal salt, the molar ratio of salt to olefins being from 0.0001 to 0.10.

9. A process for reacting propylene and butadiene to form normally fluid products which comprises contacting the olefins at a pressure of at least 10 atmospheres, at a temperature within the range of from about 20° to 275° C., and in the presence of a group VIII noble metal salt, the molar ratio of salt to olefins being from 0.0001 to 0.10.

10. A process for olefin self-addition to form normally fluid products comprising reacting ethylene at a pressure of at least 10 atmospheres and at a temperature in the range of from about 20° to 275° C., in the presence of a group VIII noble metal salt, the molar ratio of salt to ethylene being from 0.0001 to 0.10.

11. A process for olefin self-addition to form normally fluid products comprising reacting methyl acrylate at a pressure of at least 10 atmospheres and at a temperature in the range of from about 20° to 275° C., in the presence of a group VIII noble metal salt, the molar ratio of salt to methyl acrylate being from 0.0001 to 0.10.

12. A process for preparing normally fluid products from alpha-olefinic compounds which comprises reacting an alpha-olefinic compound of the formula $$H_2C=\overset{H}{\underset{|}{C}}-X$$

wherein X represents a member of the group consisting of hydrogen, hydrocarbon, halogen, halohydrocarbon, alkoxycarbonyl, and carboxylatoalkyl, said compound having up to 12 carbon atoms with a different alpha olefinic compound of the formula $$H_2C=\overset{H}{\underset{|}{C}}-X$$

wherein X is as defined above at a pressure of at least 10 atmospheres and at a temperature in the range of from about 20° to 275° C., in the presence of a catalytic amount of a group VIII noble metal salt, the molar ratio of salt to alpha-olefinic compound being up to 0.10.

13. A process for preparing normally fluid products by olefin self-addition comprising reacting an alpha-olefinic compound of the formula $$H_2C=\overset{H}{\underset{|}{C}}-X$$

wherein X represents a member of the group consisting of hydrogen, hydrocarbon, halogen, halohydrocarbon, alkoxycarbonyl and carboxylatoalkyl, said compound having up to 12 carbon atoms at a pressure of at least 10 atmospheres, and at a temperature in the range of 20° to 275° C., in the presence of a catalytic amount of a group VIII noble metal salt, the molar ratio of salt to alpha-olefinic compound being up to 0.10.

14. The process of claim 12 wherein the catalyst employed is rhodium trichloride.

15. The process of claim 12 wherein the catalyst employed is ruthenium trichloride.

16. A process for reacting ethylene with butadiene to form normally fluid products which comprises contacting the olefins at a pressure of at least 10 atmospheres and at a temperature in the range of 20° to 275° C., in the presence of a catalytic amount of rhodium trichloride, the molar ratio of salt to olefin being up to 0.10.

References Cited in the file of this patent

UNITED STATES PATENTS

| | | |
|---|---|---|
| 1,988,112 | Egloff | Jan. 15, 1935 |
| 2,232,785 | Hawk | Feb. 25, 1941 |
| 2,244,487 | Crawford | June 3, 1941 |
| 2,244,645 | Jacobson | June 3, 1941 |
| 2,297,039 | Van Melsen | Sept. 29, 1942 |
| 2,451,180 | Stewart | Oct. 12, 1948 |
| 2,628,252 | Albisetti | Feb. 10, 1953 |
| 2,656,398 | De Vault | Oct. 20, 1953 |